(12) United States Patent
Premchandran

(10) Patent No.: US 7,546,542 B2
(45) Date of Patent: Jun. 9, 2009

(54) USER INTERFACE INCORPORATING GRAPHICALLY BASED MANAGEMENT OF CONTROLS

(75) Inventor: Girish Premchandran, Remond, WA (US)

(73) Assignee: Microsoft Corporation, Redmond, WA (US)

( * ) Notice: Subject to any disclaimer, the term of this patent is extended or adjusted under 35 U.S.C. 154(b) by 799 days.

(21) Appl. No.: 10/807,367

(22) Filed: Mar. 23, 2004

(65) Prior Publication Data
US 2005/0212807 A1   Sep. 29, 2005

(51) Int. Cl.
*G06F 3/00* (2006.01)
*G06F 3/048* (2006.01)
*G06T 1/60* (2006.01)
*G09G 1/02* (2006.01)
*G06F 13/18* (2006.01)
*G09G 5/36* (2006.01)
*G06F 12/02* (2006.01)
*G06K 9/00* (2006.01)
*G06F 13/00* (2006.01)

(52) U.S. Cl. .......................... 715/762; 345/28; 345/530; 345/535; 345/553; 345/565; 382/251; 711/100; 715/806

(58) Field of Classification Search ................. 715/762, 715/806; 345/28, 530, 535, 553, 565, 572; 382/251; 711/100
See application file for complete search history.

(56) References Cited

U.S. PATENT DOCUMENTS 5,835,712 A * 11/1998 DuFresne ................... 709/203
5,969,717 A * 10/1999 Ikemoto ..................... 715/762
6,121,964 A *  9/2000 Andrew ..................... 715/866
6,811,608 B1 * 11/2004 Stewart et al. ............... 117/68
6,983,283 B2 *  1/2006 Sowizral et al. ............ 707/102
2002/0116416 A1 *  8/2002 Tesch et al. ................. 707/516
2002/0174085 A1 * 11/2002 Nelson et al. .................. 707/1
2005/0183006 A1 *  8/2005 Rivers-Moore et al. ..... 715/513

OTHER PUBLICATIONS

J. Eisenstein et al. "Adapting to Mobile Contexts with User-Interface Modeling," RedWhale Software Corporation 2000. pp. 1-15.
Luyten, K.; and Coninx, K.; "An XML-based runtime user interface description language for mobile computing devices," Expertise Centre for Digital Media, Limburgs Universitair Centrum, Belgium, pp. 1-15.
Wachowicz, M.; and Hild, Stefan,; "Combining Location and Data Management in an Environment for Total Mobility," University of Cambridge Computer Laboratory, 1996, pp. 1-12.
Imielinski, T.; and Badrinath, B. "Mobile Wireless Computing: Challenges in Data Management," Department of Computer Science, Rutgers University, 1994, pp. 1-17.
Jianliang Xu et al. "Performance Evaluation on an Optimal Cache Replacement Policy for Wireless Data Dissemination," IEEE 2002, pp. 1-37.
T. Imielinski et al. "Data on Air: Organization and Access," IEEE Transactions on Knowledge and Data Engineering, vol. 9, No. 3, May-Jun. 1997, pp. 353-372.
Landay, J.; and Kaufmann, T.; "User Interface Issues in Mobile Computing," Proceedings of the Fourth Workshop on Workstation Operating Systems, Oct. 1993, pp. 1-8.

* cited by examiner

*Primary Examiner*—William L Bashore
*Assistant Examiner*—Stephen Alvesteffer
(74) *Attorney, Agent, or Firm*—Westman, Champlin & Kelly, P.A.

(57) ABSTRACT

Methods are disclosed for selectively loading one control at a time based on the location of a selection component relative to a graphical representation of a user interface.

15 Claims, 9 Drawing Sheets

USER INTERFACE INCORPORATING GRAPHICALLY BASED MANAGEMENT OF CONTROLS

BACKGROUND OF THE INVENTION

The present invention relates to memory management methods that enable load time reductions for mobile and other computing devices. More specifically, the present invention pertains to a method for selectively, rather than collectively, loading controls.

For any computing device running an application, it is desirable that user interface information be loaded and rendered as efficiently as possible. For example, it is generally desirable to reduce the time necessary for an Internet browser program to load a web page. In the context of mobile computing devices (e.g., Personal Digital Assistants, Pocket PC's, palm computers, handheld computers, smart phones, intelligent mobile phones, etc.), which are commonly susceptible to certain memory constraints, efficient loading and rendering becomes a particularly important aspiration. It is expected that the popularity of mobile computing devices will continue to increase in the future. Accordingly, it is likely that the demand for efficient loading and rendering of user interface information will correspondingly increase.

SUMMARY OF THE INVENTION

Embodiments of the present invention pertain to a method for selectively loading one control at a time based on the location of a selection component relative to a graphical representation of a user interface.

DETAILED DESCRIPTION OF ILLUSTRATIVE EMBODIMENTS

I. First Exemplary Environment

Figure 1:
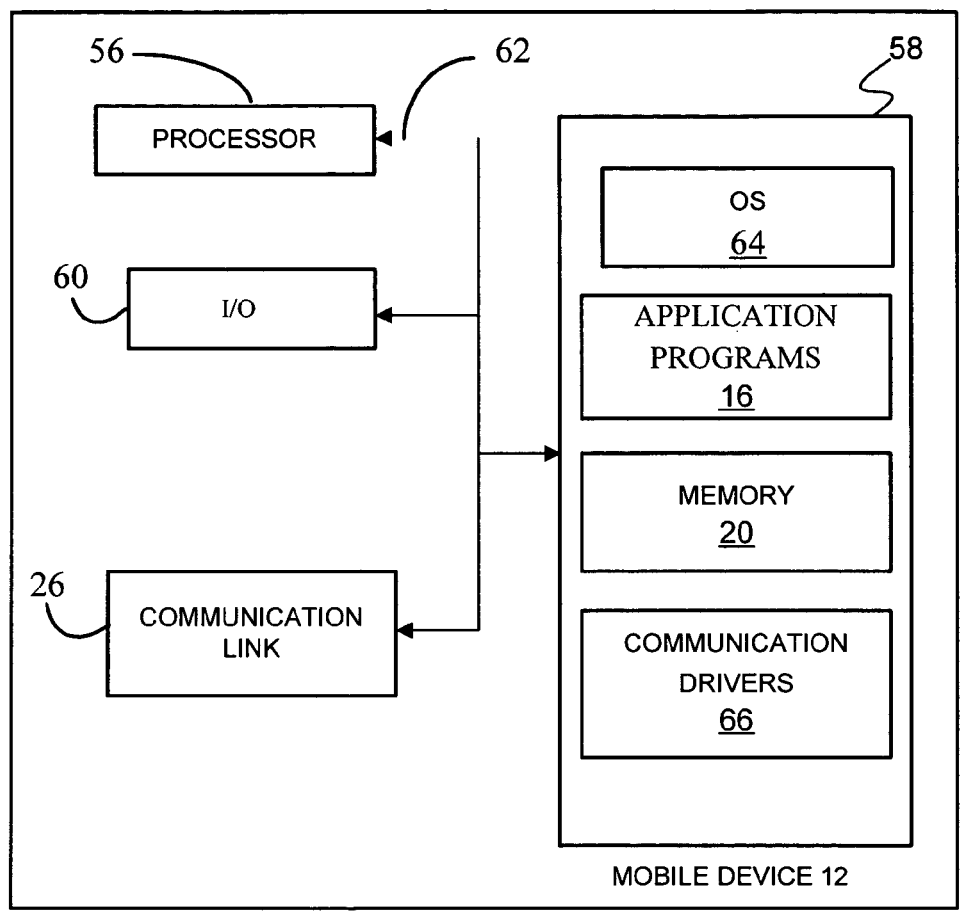
FIG. 1 is a block diagram illustrating a mobile device environment.

FIG. 1 is a block diagram of a mobile device 12, which is one exemplary environment within which embodiments of the present invention can be implemented. Mobile device 12 includes application programs 16, a corresponding memory 20 and communication link 26. Mobile device 12 also includes memory 58, microprocessor 56, operating system 64, input/output (I/O) components 60, and communication drivers 66. Components of mobile device 12 are illustratively coupled for communication with one another over a suitable bus 62. It will be appreciated that mobile device 12 includes a number of other non-illustrated components.

Referring to mobile device 12, memory 58 is preferably implemented as non-volatile electronic memory such as random access memory (RAM) with a battery back-up module (not shown) such that information stored in memory 58 is not lost when the general power to mobile device 12 is shut down. A portion of memory 58 is illustratively allocated as addressable memory for program execution, while another portion of memory 58 is optionally used for storage, such as to simulate storage on a disc drive. Memory 58 can include operating system 64, as well as one or more application programs 16 and corresponding memory structure 20. Application programs 16 can illustratively include a customer relationship management (CRM) program, an Internet browser program, or any other type of program.

During operation, operating system 64 is illustratively executed by processor 56 from memory 58. The operating system 64 implements features that can be utilized by application programs 16 through a set of exposed application programming interfaces and methods. It will be appreciated that devices 12 can actually incorporate multiple application programs each with a corresponding memory, rather than the illustrated single collection of application programs with a single corresponding memory.

I/O components 60, in one embodiment, are provided to facilitate input and output operations in association with a user of mobile device 12. I/O components 60 for various embodiments of mobile device 12 can include input components such as buttons and touch sensors, as well as output components such as a display, a speaker, and/or a printer port. Other I/O components are conceivable and within the scope of the present invention.

Communication link 26 is any suitable communication interface. Interface 26 is illustratively used to communicate with another computing device. Memory 58 includes a set of communication drivers 66 that interact with communication link 26, and that translate data to and from the appropriate communication protocol necessary to enable communication across the link 26.

Device 12 communicates through link 26 and across any of a variety of remote communication means and corresponding protocols. Such means potentially include, but are not limited to, a physical cable and a serial communication protocol, infra-red (IR) communication, direct modem communication, remote dial-up-networking communication, communication through commercially available network cards (i.e., using TCP/IP), remote access services (RAS), a wireless modem communication, wireless cellular digital packet data (CDPD), wireless Bluetooth™ communication, FireWire communication, or any other suitable communication mechanism or means. Although the communication link is shown as being internal to mobile device 12, those skilled in the art will recognize that at least portions of the communication link may exist outside of the device.

Application programs 16 may include Personal Information Manager (PIM) programs, which support, for example, electronic mail messaging, scheduling, calendering, etc. Of course, application programs 16 can be configured to support a wide variety of other features, such as task lists and personalized address books, to name a few. Memory 20 is configured to store a plurality of individual records or objects, each comprising a plurality of fields or properties related to application programs 16.

Figure 3:
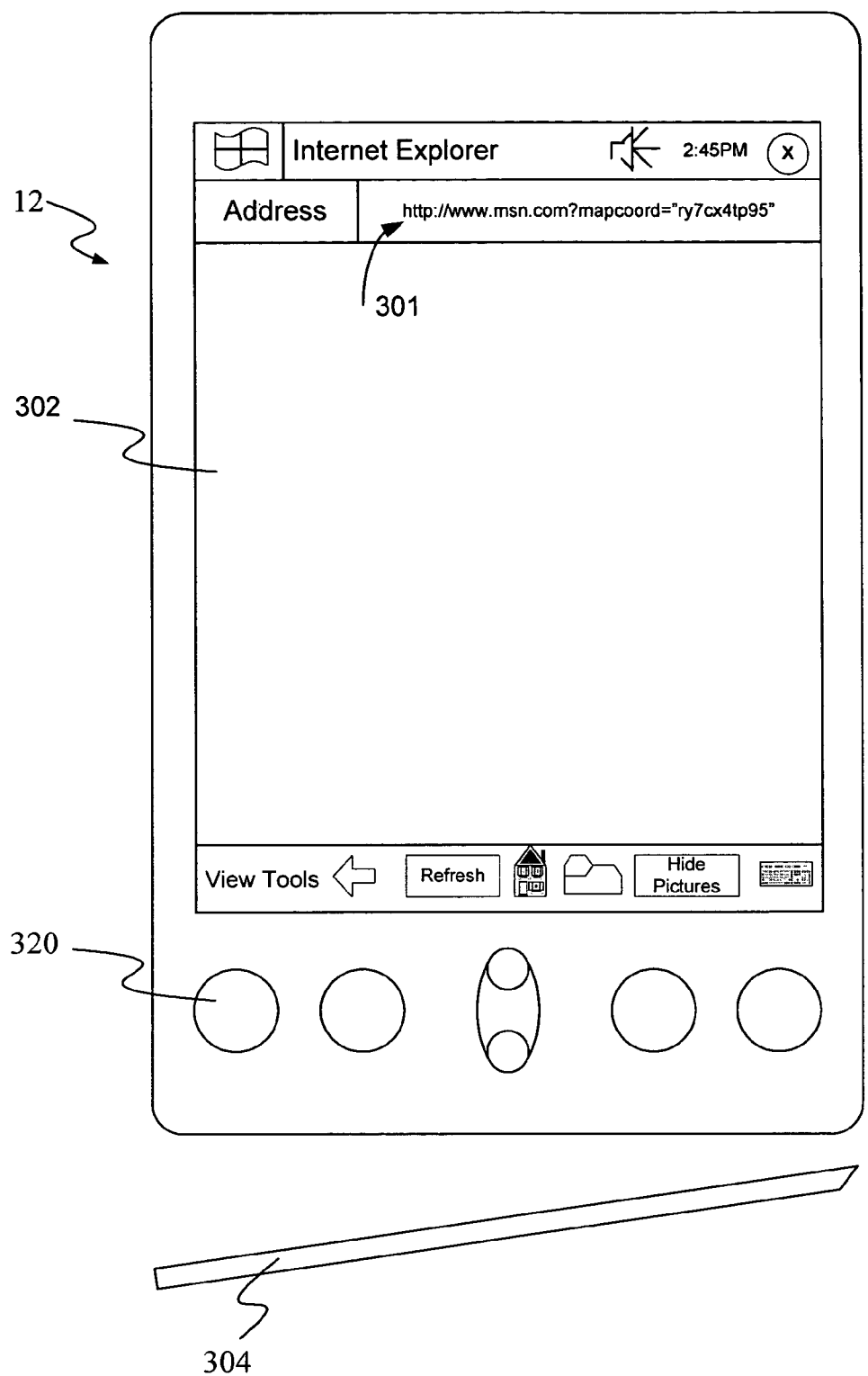
FIG. 3 is a simplified pictorial illustration of one specific embodiment of a mobile device.

FIG. 3 is a simplified pictorial illustration of one embodiment of a mobile device 12. Mobile device 12, as shown in FIG. 3, includes a display screen 302 that can sense the position of stylus 304 relative to the screen and thereby allow the user to select objects on the screen, as well as write and draw through screen input. The mobile device 12 shown in FIG. 3 also includes a number of user input keys or buttons, such as button 320, which allow the user to scroll through menu options or other display options which are displayed on display 302, or which allow the user to change applications or select user input functions, without contacting display 302.

The mobile device of FIG. 3 is illustrated with a World Wide Web Internet browser operating thereon. Device 12 is illustratively configured to access web pages in association with such a browser. As is known in the art, the web pages are accessed using a URL such as the illustrated URL 301.

Figure 4:
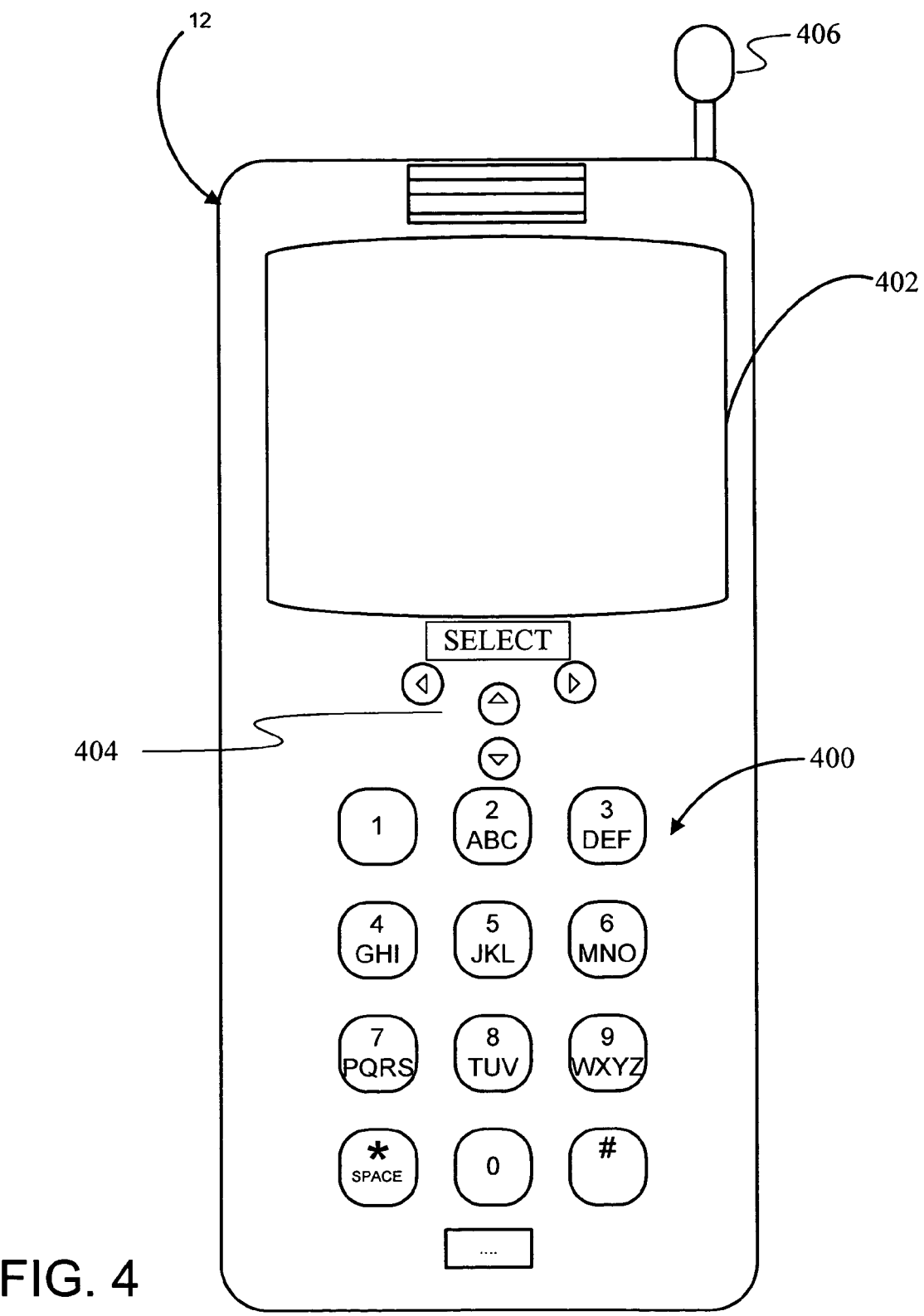
FIG. 4 is a simplified pictorial illustration of another specific embodiment of a mobile device.

FIG. 4 provides a pictorial diagram of a phone embodiment of a mobile device 12. The phone includes a set of keypads 400 for dialing phone numbers, a display 402 capable of displaying application images, and control buttons 404 for selecting items shown on the display. The phone includes an antenna 406 for receiving and sending cellular phone signals such as General Packet Radio Service (GPRS) and 1Xrtt, and Short Message Service (SMS) signals. When operating in association with a cellular phone signal, the phone establishes a connection with a carrier. Generally, the carrier charges a fee based on the length of time that this connection is maintained.

It should be noted that device 12 and the other exemplary devices described herein are only examples of devices suitable to support embodiments of the present invention. The description of such devices is not intended to suggest any limitation as to the scope of use or functionality of the present invention. Neither should the devices be interpreted as having any dependency or requirement relating to any one or combination of components illustrated in FIGS. 1-4 or any subsequently described Figure. Accordingly, the present invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephone systems, distributed computing environments that include any of the above systems or devices, and the like.

II. Second Exemplary Environment

Figure 2:
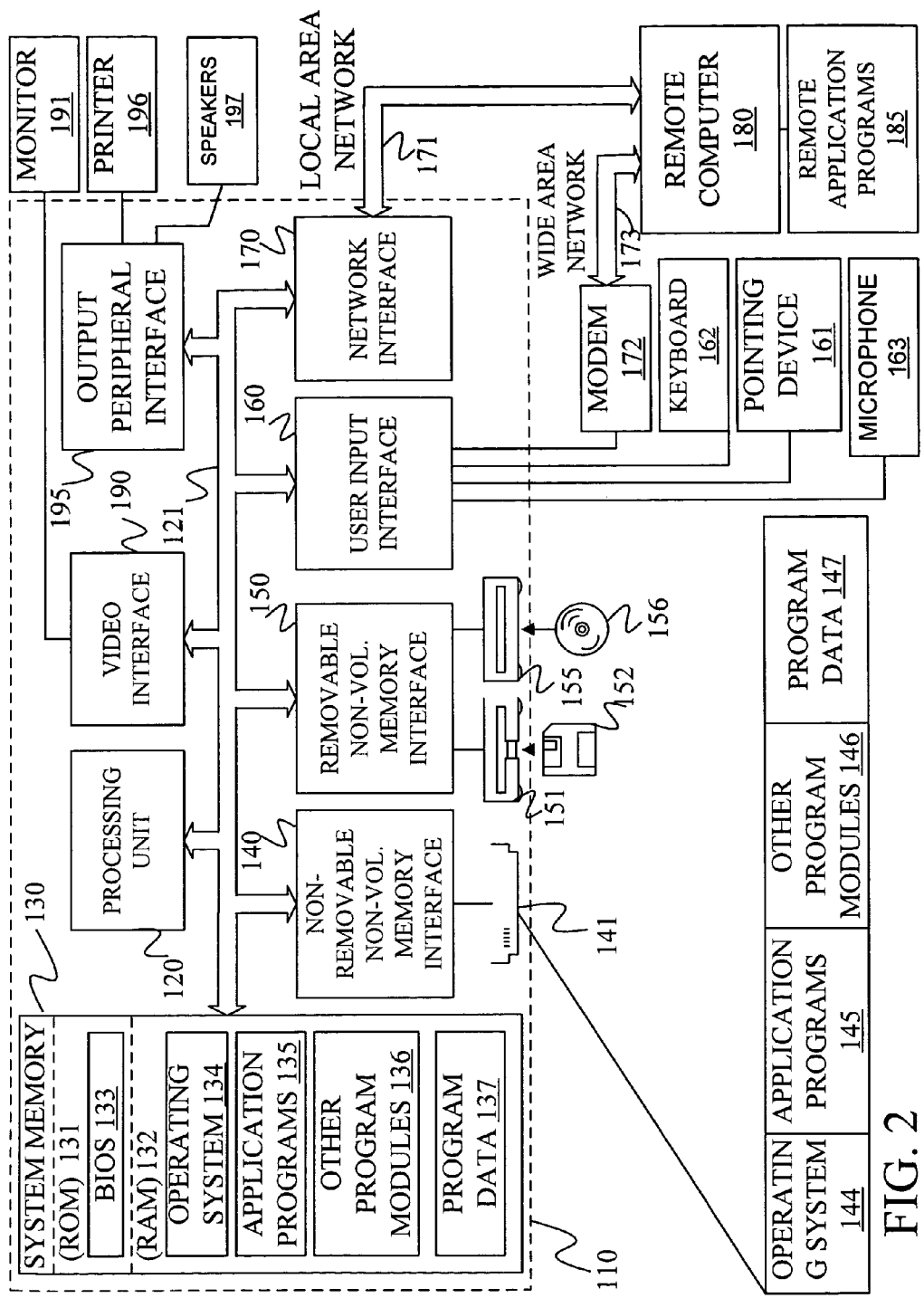
FIG. 2 is a block diagram of a general computing device environment.

FIG. 2 is an exemplary computing system for implementing embodiments of the present invention. The Figure presents one example of a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180, which can include mobile device 12. The remote computer 180 may be a personal computer, a hand-held device, a server, a router, a network PC, a peer device or other common network node, and typically includes many or all of the elements described above relative to the computer 110. The logical connections depicted in FIG. 2 include a local area network (LAN) 171 and a wide area network (WAN) 173, but may also include other networks. Such networking environments are commonplace in offices, enterprise-wide computer networks, intranets and the Internet. In addition, the network connections between any of the nodes in the network may include direct cable connections or wireless connections and the connection between computer 110 and remote computer 180 may include any number of nodes and/or routers.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on remote computer 180. It will be appreciated that the network connections shown are exemplary and other means of establishing a communications link between the computers may be used.

III. Graphically Based Selective Control Loading

It should be noted that the present invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by a remote processing devices that are linked through a communications network. In a distributed computing environment, program modules may be located in both local and remote storage media including memory storage devices.

The present invention is not limited to any single device or application. However, for the purpose of simplifying the present description, embodiments will be described in relation to some specific examples, namely, a mobile device having a customer relationship management application installed and running thereon. The scope of the present invention, however, is not so limited.

Figure 5:
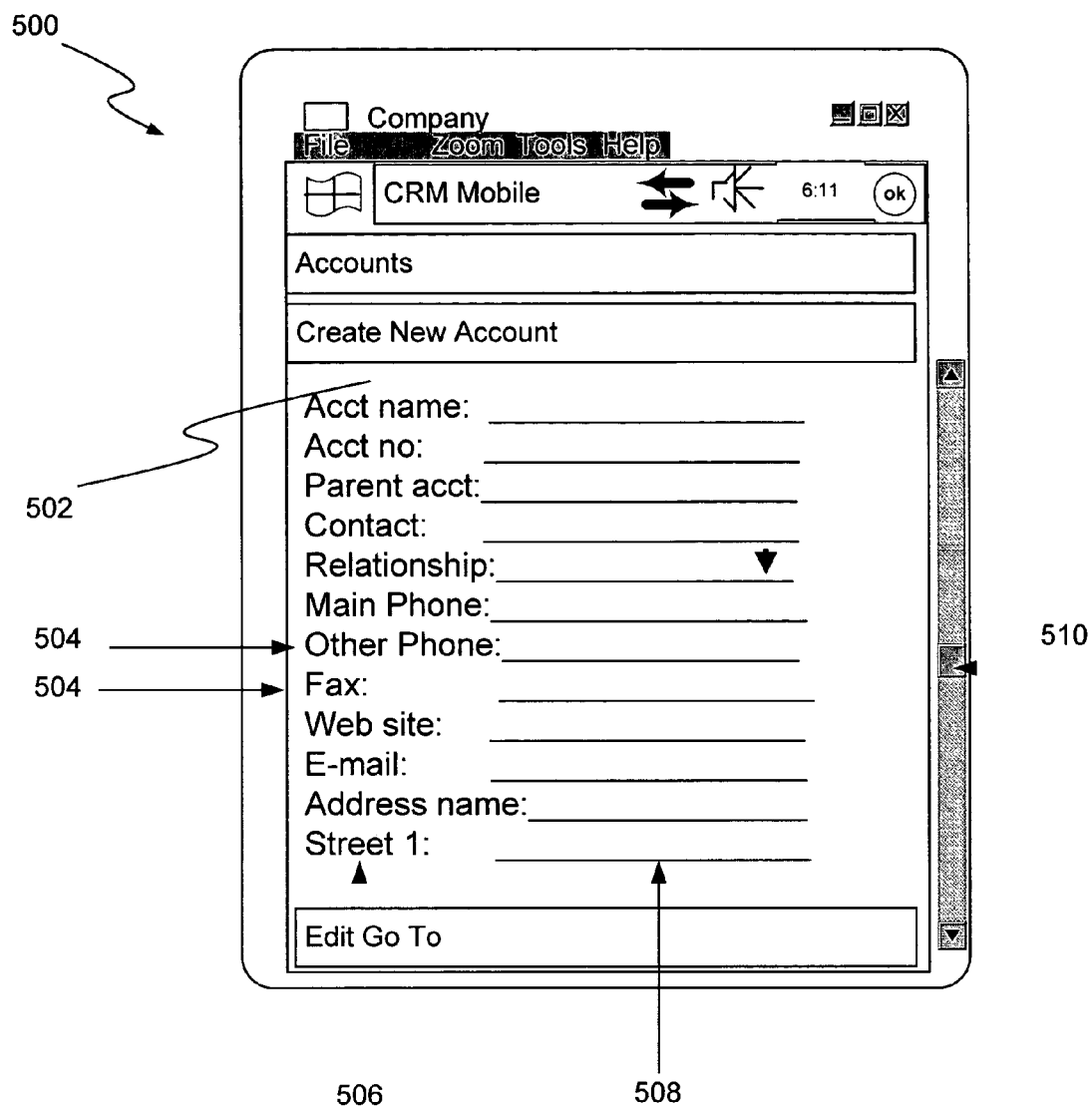
FIG. 5 is a pictorial illustration of a screen shot.

FIG. 5 is a pictorial illustration of a screen shot 500 including a form 502. Screen shot 500 is illustratively associated with a mobile customer relationship management application and is illustratively configured to be displayed on a mobile computing device, similar to the manner in which the web browser output is displayed on device 12 in FIG. 3.

Form 502 is illustratively configured to display data in a row-column format. The form illustratively includes twenty rows that each contain two columns. Within FIG. 5, an exemplary two of the rows have been labeled 504. Only twelve rows are shown but it is understood that the remaining rows are revealed through a downward scrolling of scroll bar 510.

The first column has been labeled 506 and the second column has been labeled 508. The first column 506 of one of the labeled rows illustratively includes the designation "Other phone", while the first column of the other labeled row includes the designation "Fax". As is typical in the art, for each of the twenty rows 504, second column 508 includes a blank that can be filled in with information input by a user to correspond to the respective designation in column 506.

Accordingly, in accordance with one aspect of the present invention, column 506 contains a collection of textual indicators and column 508 contains a collection of control boxes (e.g., textboxes, comboboxes, or other another control). In accordance with one embodiment, the illustrated page 502 contains about forty different controls (i.e., a label control with text in first column row and the corresponding control in the second column). Each column 506 label is illustratively configured as a control in order to activate the corresponding column 508 control upon selection (e.g., clicking on the label itself activates a corresponding textbox or drop-down box).

It is generally understood that the memory capacity for the typical mobile computing device is relatively constrained or limited. In light of this and other limitations, it is not uncommon for the loading of numerous controls (e.g., forty controls) to require a significant investment in load time. It is not uncommon for the load time for controls associated with a form to be displayed on a mobile device to be relatively high. The load time grows as the number of controls on the form increases. Also, an increasing of the number of controls on a page is generally a memory drain. Each entry in a database made to indicate control activity has an impact on loading performance (e.g., the data in column 508 text box associated with the Fax line is stored in and read from the database).

For at least these reasons, reductions in load time and memory usage are desirable. In accordance with one aspect of the present invention, in order to accomplish such reductions, a graphically based (e.g., bitmap based) component representation is implemented wherein mouse clicks are monitored and controls are selectively loaded accordingly. Depending on where the user selects (e.g., a click of the mouse) relative to a graphical representation (e.g., a representation of a form), a control is instantiated. This method reduces load time and improves memory management. In addition, for applications incorporating a user interface with scrolling functionality (e.g., the interface illustrated in FIG. 5), scrolling will happen faster since only one control need be managed at a time (e.g., rather than twenty or forty). Accordingly, as a user scrolls (e.g., scrolls through a form), controls need not be loaded simply because they are newly revealed.

Figure 6:
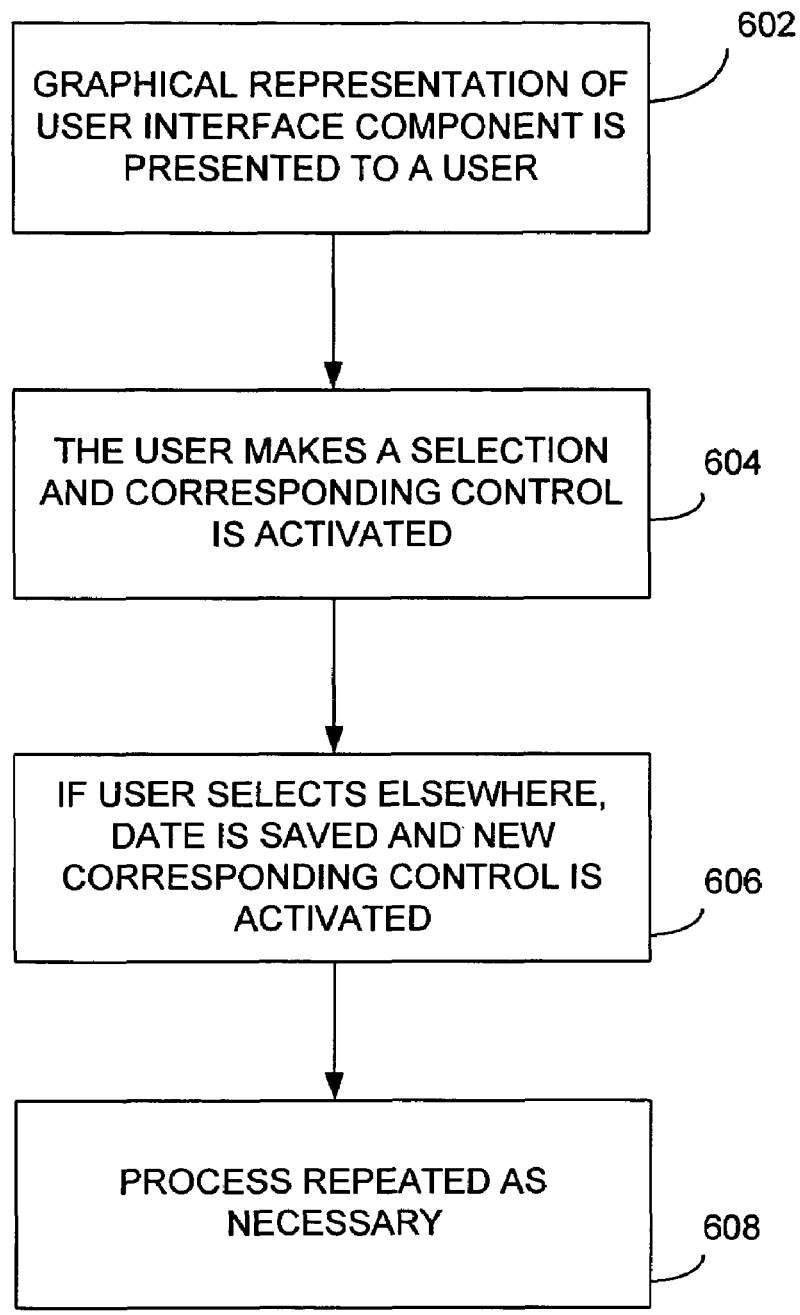
FIG. 6 is a flow chart demonstrating steps associated with selectively activating controls.

FIG. 6 is a flow chart demonstrating steps associated with selectively activating controls in accordance with one aspect of the present invention. In accordance with block 602, a graphical representation of a user interface component (e.g., a bitmap representation of a form) is presented to a user in place of a representation containing numerous controls. The graphical representation includes means, illustratively a parent control, for keeping track of where (e.g., the coordinate location) the user initiates a selection relative to the graphical interface. In accordance with block 604, upon a selection indication by the user, a control specific to the point of selection is activated by the parent control.

Figure 7:
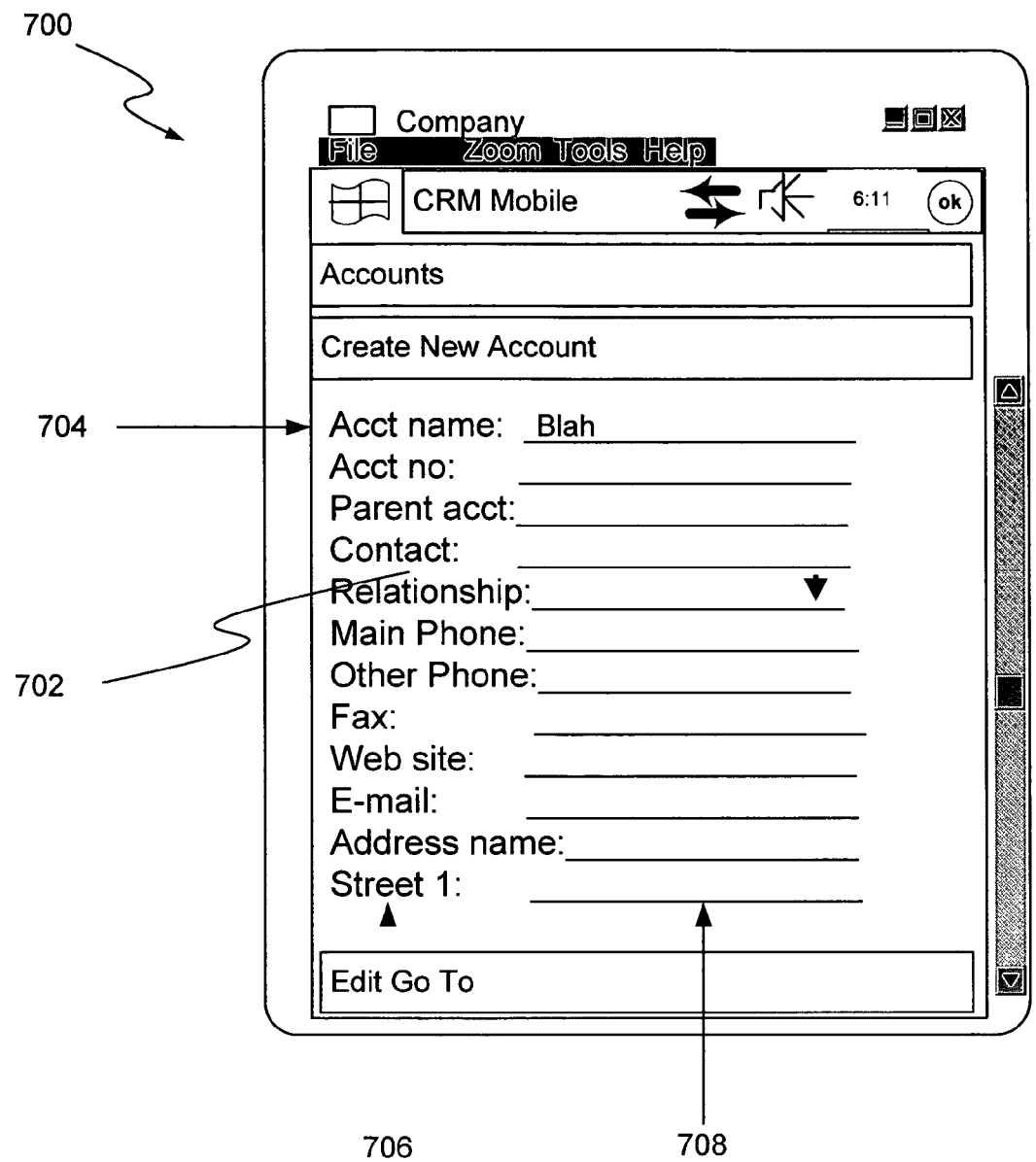
FIG. 7 is a pictorial illustration of a screen shot.

FIG. 7 is a pictorial illustration of a screen shot 700 including a form 702. Screen shot 700 is substantially similar to screen shot 500 described in relation to FIG. 5, and indeed includes rows 704 and columns 706/708 that correspond to its form 502 counterpart. However, form 702 is illustratively a graphical representation of a form generated in accordance with block 602 in the FIG. 6 flow. In accordance with block 604, a user has illustratively selected the column 708 selection that corresponds to the "Acct name" row 704. Based on the coordinates of the point of selection, a corresponding text box control is illustratively opened up, wherein the user has typed in the text "Blah".

In accordance with block 606, if the user selects elsewhere on the representation, the parent control saves the data associated with the first activated control and activates a different control corresponding to the new point of selection. Accordingly, only one child control is active on the form at a time. In this manner, memory usage and loading time are limited.

Figure 8:
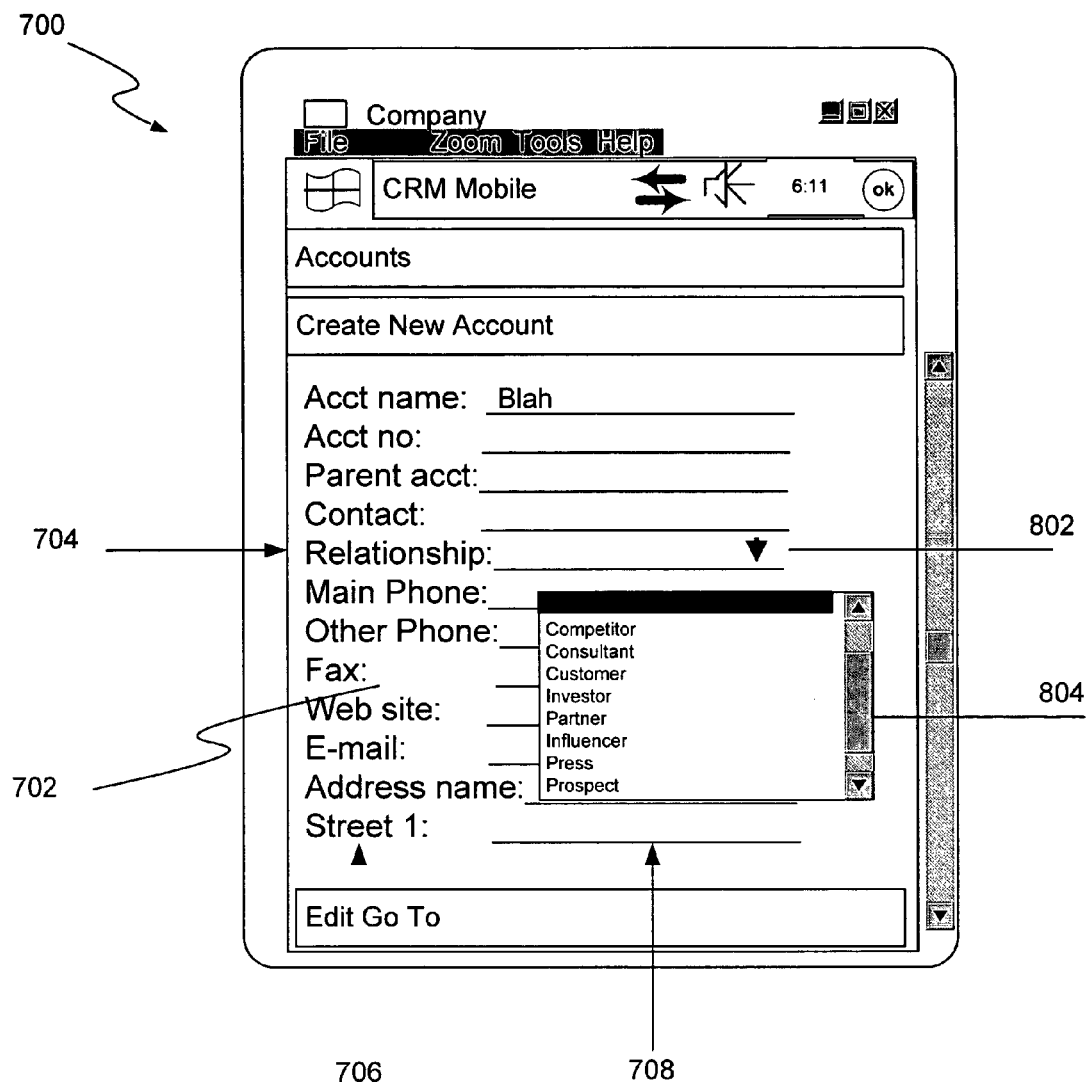
FIG. 8 is a pictorial illustration of a screen shot.

FIG. 8 is an additional pictorial illustration of screen shot 700, wherein the user has now selected (i.e., clicked on) a drop down button 802. Upon this selection, the "Blah" text is illustratively saved in its input location and its text box control is terminated. In accordance with one embodiment, the "Blah" text is rendered graphically in its input location following termination of the control. When button 802 is selected, the parent control activates a child control associated with the coordinates of the selection. In this case, the child control will cause a drop down box 804 to be presented to the user for selection purposes. When a selection has been made from box 804, selected text will be added to the corresponding line 704 in column 708. Finally, as is indicated in block 608 of the FIG. 6 flow, the process is then repeated as necessary.

In accordance with one embodiment of the present invention, the formation of the graphical representation will now be described in greater detail. In order to demonstrate the general formation method specifically, a method for the formation of form 702 will be described. The present invention, however, is not limited to forms similar to form 702. The concepts could just as easily be applied to other user interfaces, such as a web browser interface (e.g., all or a portion of a web page is graphically rendered and controls are selectively called based on selection location).

Figure 9:
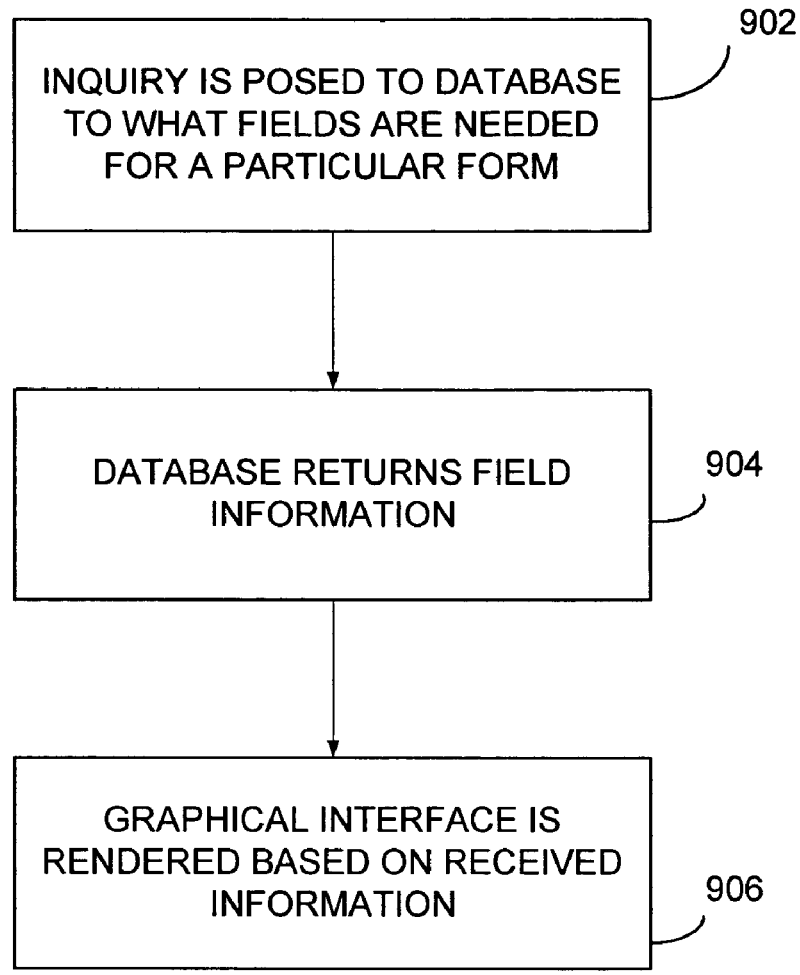
FIG. 9 is a flow chart demonstrating steps associated with formation of a graphical representation component.

FIG. 9 is a flow chart demonstrating steps associated with formation of a described graphical representation. The formation of a form 702 is illustratively metadata driven, meaning that it is constructed based on information stored in a database. For example, in accordance with block 902, to initiate the construction of the form, an inquiry is first posed to a database as to what fields are needed (e.g., needed for an account form 702). In accordance with step 904, the database returns a list of fields, one of which is "Acct name". The database also returns an indication that the "Acct name" field is a text field. Given this information, it is now understood that a column 706 label needs to be created with the text set to "Acct name". It is also understood that a corresponding column 708 text box representation needs to be placed next to the label. In accordance with block 906, graphical rendering is carried out in accordance with the information received from the database. A similar process is carried out for the remainder of the form components until the entire user interface component is rendered.

In accordance with one specific embodiment, the parent control associated with the graphical (e.g., bitmap) representation is designed to create a form that is essentially a listbox configured to hold a list of items (e.g., each item is a label and a textbox representation). The listbox, illustratively referred to as a FormItemListBox, will ultimately contain a plurality of items each referred to as a FormItem. Accordingly, a completed FormItemListBox consists of a graphical representation (e.g., a bitmap) containing a list of FormItems.

In accordance with one embodiment, when the form loads up, the parent control creates a general FormItemListBox and obtains a list of items that it needs to hold. The list is illustratively referred to as an ItemList. The FormItemListBox loops through the ItemList and retrieves an item width and height for each FormItem. Once width and height data has been collected, the FormItemListBox is substantiated as a graphical (e.g., bitmap) representation configured to hold all the FormItems. For example:

ListBoxWidth=Width of FormItemListBox

ListBoxHeight=Item1Height+Item2Height . . . ItemN-Height

Accordingly, each FormItem is illustratively assigned a rectangle in which the item can draw itself. The FormItemListBox then loops over the items and requests that they draw themselves within the assigned rectangle. For example, with reference to FIG. 7, the FormItem holding "Acct name" knows that in its rectangle it needs to draw a string called "Acct name" in bold font, a ":", and an underline. If it had some data in for "Acct name", then it would draw the data too (e.g., if "Blah" had previously been entered and saved, then "Blah" would be drawn in too).

In this manner, the graphical representation is drawn by instructing each FormItem to draw itself. This drawing process is significantly quicker than the previously practiced method of instantiating all form controls. Also, a scrolling functionality now only requires scrolling the graphic representation.

In accordance with one aspect of the present invention, when the user selects (e.g., clicks) on a particular location on the listbox, the listbox parent control collects the coordinates of the selection (e.g., of the mouse click), determines which FormItem owns that area, and notifies the FormItem that it is now "InFocus". The FormItem in turn looks up the controls it needs to create and, as in the case of "Acct name", determines it needs to create a textbox. Accordingly, when the user clicks in the "Acct name" rectangle, a textbox is created and can be typed in.

In accordance with one aspect of the present invention, if the user clicks elsewhere, for example in the "Relationship" FormItem area, the listbox first notifies the "Acct name" FormItem that it has lost focus. The "Acct name" FormItem takes data input by the user, saves it and then destroys its control. It then paints itself on the graphical image with the data that was input (e.g., "blah"). The listbox then notifies the "Relationship" FormItem that it is now InFocus. Since the Relationship FormItem is supposed to show a ComboBox, the drop down box is substantiated in accordance with the appropriate control.

Although the present invention has been described with reference to particular embodiments, workers skilled in the art will recognize that changes may be made in form and detail without departing from the spirit and scope of the invention.

What is claimed is:

1. A computer implemented method for selectively loading controls, the method comprising:
   displaying a graphical representation of a first user interface component having a visual appearance of a mechanism for facilitating an input of text;
   receiving a first selection input that corresponds to the graphical representation;
   loading a first control in response to the first selection input, the first control being associated with the graphical representation and configured to facilitate an incorporation of text into the graphical representation, wherein loading the first control comprises transferring the first control from a computing device storage memory to a computing device addressable memory for execution;
   displaying a graphical representation of a second user interface component having a visual appearance of a mechanism for facilitating an input of text;
   receiving a second selection input that corresponds to the graphical representation of the second user interface component;
   terminating said first control in response to the second selection input, wherein terminating the first control comprises removing the first control from the computing device addressable memory; and
   loading a second control in response to the second selection input, the second control being associated with the graphical representation of the second user interface component and configured to facilitate an incorporation of text into the graphical representation of the second user interface component, wherein loading the second control comprises transferring the second control from the computing device storage memory to the computing device addressable memory for execution.

2. The method of claim 1, wherein the graphical representations of the first and second user interface components are each separate elements of the same user interface.

3. The method of claim 1, further comprising:
   receiving a data input that corresponds to said first control;
   rendering a representation of the data input as part of the graphical representation of the first user interface component.

4. The method of claim 3, wherein said rendering occurs prior to said terminating.

5. The method of claim 3, wherein said rendering occurs prior to said activating a second control.

6. The method of claim 1, wherein loading a first control comprises loading a textbox control.

7. The method of claim 1, wherein loading a first control comprises loading a combobox control.

8. The method of claim 1, wherein providing a graphical representation of a first user interface component comprises providing a graphical representation of a user interface that includes a plurality of user interface components including the first user interface component.

9. The method of claim 8, wherein providing a graphical representation of a user interface comprises providing a graphical representation of a listbox.

10. The method of claim 9, wherein providing a graphical representation of a listbox comprises providing a graphical representation of a listbox that includes said graphical representation of the first user interface component in the form of a list item.

11. The method of claim 9, wherein providing a graphical representation of a listbox comprises providing a graphical representation of a listbox that includes said graphical representation of the first user interface component in the form of a textbox representation.

12. The method of claim 9, wherein providing a graphical representation of a listbox comprises providing a graphical representation of a listbox that includes said graphical representation of the first user interface component in the form of a combobox representation.

13. The method of claim 8, wherein providing a graphical representation of a user interface comprises providing a graphical representation of an Internet browser interface.

14. The method of claim 1, wherein receiving a selection input that corresponds to the graphical representation of the first user interface component comprises receiving a selection input at a coordinate location that lines up with the graphical representation of the first user interface component.

15. The method of claim 1, providing a graphical representation comprises providing a computer-readable image format representation.

* * * * *